United States Patent [19]

Kimura et al.

[11] Patent Number: 5,540,986
[45] Date of Patent: Jul. 30, 1996

[54] STAMPABLE SHEET MADE OF FIBER-REINFORCED THERMOPLASTIC RESIN AND MOLDED ARTICLE THEREFOR

[75] Inventors: Hiroshi Kimura, Gifu; Makoto Maeda, Hashima; Toshihara Hirai, Noda, all of Japan

[73] Assignee: UBE-Nitto Kasei Co., Ltd., Tokyo, Japan

[21] Appl. No.: 88,109

[22] Filed: Jul. 9, 1993

Related U.S. Application Data

[63] Continuation of Ser. No. 671,804, filed as PCT/JP90/00886, Jul. 10, 1990, published as W)91/00796, Jan. 24, 1991, abandoned.

[30] Foreign Application Priority Data

Jul. 10, 1989 [JP] Japan .................................. 1-177699

[51] Int. Cl.$^6$ .............................. B32B 15/00; B32B 5/06; B32B 5/22; D04H 3/02
[52] U.S. Cl. .......................... 428/285; 428/294; 428/299; 428/300; 428/301
[58] Field of Search ................................. 428/285, 294, 428/299, 300, 301

[56] References Cited

U.S. PATENT DOCUMENTS

| | | |
|---|---|---|
| 3,664,909 | 5/1972 | Ackley .................................. 161/141 |
| 4,277,531 | 7/1981 | Picone .................................. 428/300 |
| 4,291,084 | 9/1981 | Segal .................................... 428/297 |
| 4,335,176 | 6/1982 | Baumann ............................... 428/228 |
| 4,692,375 | 9/1987 | Neubauer et al. .................... 428/299 |
| 4,749,613 | 6/1988 | Yamada et al. ....................... 429/286 |
| 4,892,772 | 1/1990 | Su .......................................... 428/294 |
| 4,916,010 | 4/1990 | Yamana et al. ....................... 428/297 |

Primary Examiner—James D. Withers
Attorney, Agent, or Firm—Nixon & Vanderhye

[57] ABSTRACT

The invention relates to a stampable sheet made of fiber-reinforced thermoplastic resin whose reinforcement is a glass fiber mat in which a non-oriented fiber layer and a unidirectional fiber layer are mechanically intertwined with each other. In the stampable sheet made of the fiber-reinforced thermoplastic resin according to the invention, a content of the glass long-fiber bundles forming the unidirectional fiber layer, in the glass fiber mat is 20 wt % to 80 wt %, and the glass fiber mat, in which a significant amount of glass long-fiber bundles among the glass long-fiber bundles forming the unidirectional fiber layer or a significant amount of glass long-fibers in the glass long-fiber bundles forming the unidirectional fiber layer is substantially under a relaxation condition, is used in an amount of 20 wt %~55 wt %. A molded article comprising at least one stampable sheet is also part of the invention.

9 Claims, 4 Drawing Sheets

STAMPABLE SHEET MADE OF FIBER-REINFORCED THERMOPLASTIC RESIN AND MOLDED ARTICLE THEREFOR

This is a continuation of application Ser. No. 07/671,804, filed as PCT/JP90/00886, Jul. 10, 1990, published as WO91/00796, Jan. 24, 1991, now abandoned.

TECHNICAL FIELD

The present invention relates to stampable sheets made of fiber-reinforced thermoplastic resins and molded articles thereof and, more particularly, to stampable sheets made of a fiber-reinforced thermoplastic resin, suitable in press molding of molded parts or products such as a bumper beam for a vehicle or the like in which particularly high mechanical strength in a specific direction is required, and to molded articles formed by molding of the stampable sheet.

BACKGROUND ART

A fiber-reinforced thermoplastic resin-made stampable sheet (hereinafter referred to as "FRTP stampable sheet") that is one of fiber-reinforced-resin composite materials capable of being press-molded, is increasing its demand especially in structural components for a vehicle, as an alternative material (substituent) for a metal material, in view of its superior product strength, processability, mass productivity, light-weightness, corrosion resistance, elastic recoverability, energy absorbability and the like.

The FRTP stampable sheet can broadly be divided into a unidirectional reinforced sheet, a bidirectional reinforced sheet, a non-oriented reinforced sheet, and a composite sheet (whose structure is a combination of the aforesaid sheets), depending upon a difference in a manner of orientation of glass long-fibers as a reinforcement. Among these, the composite sheet having a combined structure of the non-oriented reinforced sheet and the unidirectional reinforced sheet has become to be used, in substitution for the conventional metal material, as a component which is required to have mechanical strength in a specific direction (for example, in a longitudinal direction in the case of a bumper beam for a vehicle, or the like), and which is also required to have light-weightness and degree of-freedom of configuration.

Such FRTP stampable sheet, which has particularly superior mechanical strength in the specific direction, is manufactured as follows. That is, glass long-fiber bundles are shaken down spirally, whereby a laminated produce of the glass long-fiber bundles (hereinafter referred to as "non-oriented fiber layer"), which are so arranged as to have no directional property, is prepared. Further, a plurality of glass long-fiber bundles are arranged in parallel relation to each other, whereby an arranged product of glass long-fiber bundles (hereinafter referred to as "unidirectional fiber layer"), which are so arranged as to have a directional property in a specific direction, is prepared. Then, a glass fiber mat is prepared from said laminated product (non-oriented fiber layer) and said arranged product (unidirectional fiber layer) by mechanically intertwining them with each other by a needle punch or the like. Finally, the glass fiber mat as a reinforcement is impregnated with thermoplastic resin to obtain the FRTP stampable sheet.

Here, in forming the unidirectional fiber layer, in order to increase tensile strength of a product in a specific direction, that is, tensile strength of a product in the orientation direction of the glass long-fiber bundles forming the unidirectional fiber layer (hereinafter referred to as "reinforcing direction"), a relatively high tension is applied to each of the glass long-fiber bundles, such that they are arranged in parallel relation to each other and in a linear manner as far as possible.

However, the conventional FRTP stampable sheet has the following problems, because molding flowability in the reinforcing direction at stamping molding (press molding) is insufficient.

① For example, in the case of being molded into a complicated configuration having recesses for mounting stays at both ends of a bumper beam, a size of blank (cut article of the FRTP stampable sheet for molding) and a charge pattern (how to place the heated blank within a mold, at press molding) are complicated, making it difficult to obtain high productivity.

② In the case that an elongated article is molded, underfill is liable to occur at longitudinal ends.

③ At molding, abnormal orientation (weld) is liable to occur in the glass long-fibers forming the unidirectional fiber layer, making it difficult to produce a molded article which is small in variation of breaking load and which is superior in reliability.

Furthermore, the conventional FRTP stampable sheet has insufficient impregnation ability of the thermoplastic resin Into the glass long-fiber bundles forming the unidirectional fiber layer. Accordingly, the molded article, which utilizes the conventional FRTP stampable sheet, has the following problems.

① A superior tensile strength can be achieved in the reinforcing direction. In the case, however, where the FRTP stampable sheet is applied to an element or component which requires superior tensile strength and superior compressive strength, such as a bumper beam, compressive strength in the reinforcing direction referred to above Is still insufficient in view of safety.

② Since the glass fibers are liable to be exposed to a surface of a molded article, the article is inferior in fine view and is deteriorated in feel or touch. And, there may be a case where a stab is suffered by the exposed glass fiber at handling.

Accordingly, an object of the invention is to provide an FRTP stampable sheet and its molded article which have solved the above-discussed problems.

DISCLOSURE OF THE INVENTION

The invention has been made in order to achieve the above-described object and, according to the invention, there is provided a stampable sheet made of fiber-reinforced thermoplastic resin, wherein a glass fiber mat is impregnated with thermoplastic resin, said glass fiber mat being formed by mechanically intertwining (i) a non-oriented fiber layer composed of glass long-fiber bundles so arranged as to have no directional property and (ii) a unidirectional fiber layer composed of glass long-fiber bundles so arranged as to have a directional property in a predetermined direction, characterized in that a content of the glass fiber mat in the stampable sheet made of the fiber-reinforced thermoplastic resin is 20 wt %~55 wt %, that a content of the glass long-fiber bundles forming the unidirectional fiber layer, in the glass fiber mat is 20 wt %~80 wt %, and that a significant amount of glass long-fiber bundles among the glass long-fiber bundles forming the unidirectional fiber layer or a significant amount of glass long-fibers in the glass long-fiber bundles forming the unidirectional fiber layer is substantially under a relaxation condition.

By using the FRTP stampable sheet according to the invention, it is possible to provide the FRTP stampable sheet which has superior tensile strength in the reinforcing direction and which has also superior molding flowability and compressive strength in this direction.

Further, a molded article according to the invention is characterized in that the single FRTP stampable sheet or laminated FRTP stampable sheets is (are) press-molded.

By putting the invention into practice, it is possible to provide, under high productivity and easily, the molded article made of the FRTP stampable sheet which has superior mechanical strength, reliability, Fine view and easiness in handling.

BRIEF DESCRIPTION OF THE DRAWINGS

FIG. 4b is a cross-sectional view taken along the line IVb—IVb in FIG. 4a, and FIG. 4c is a cross-sectional view taken along the line IVc—IVc in FIG. 4a; FIG. 5b is a cross-sectional view taken along the line Vb—Vb in FIG. 5a.

BEST MODE FOR CARRYING OUT THE INVENTION

Figure 1:
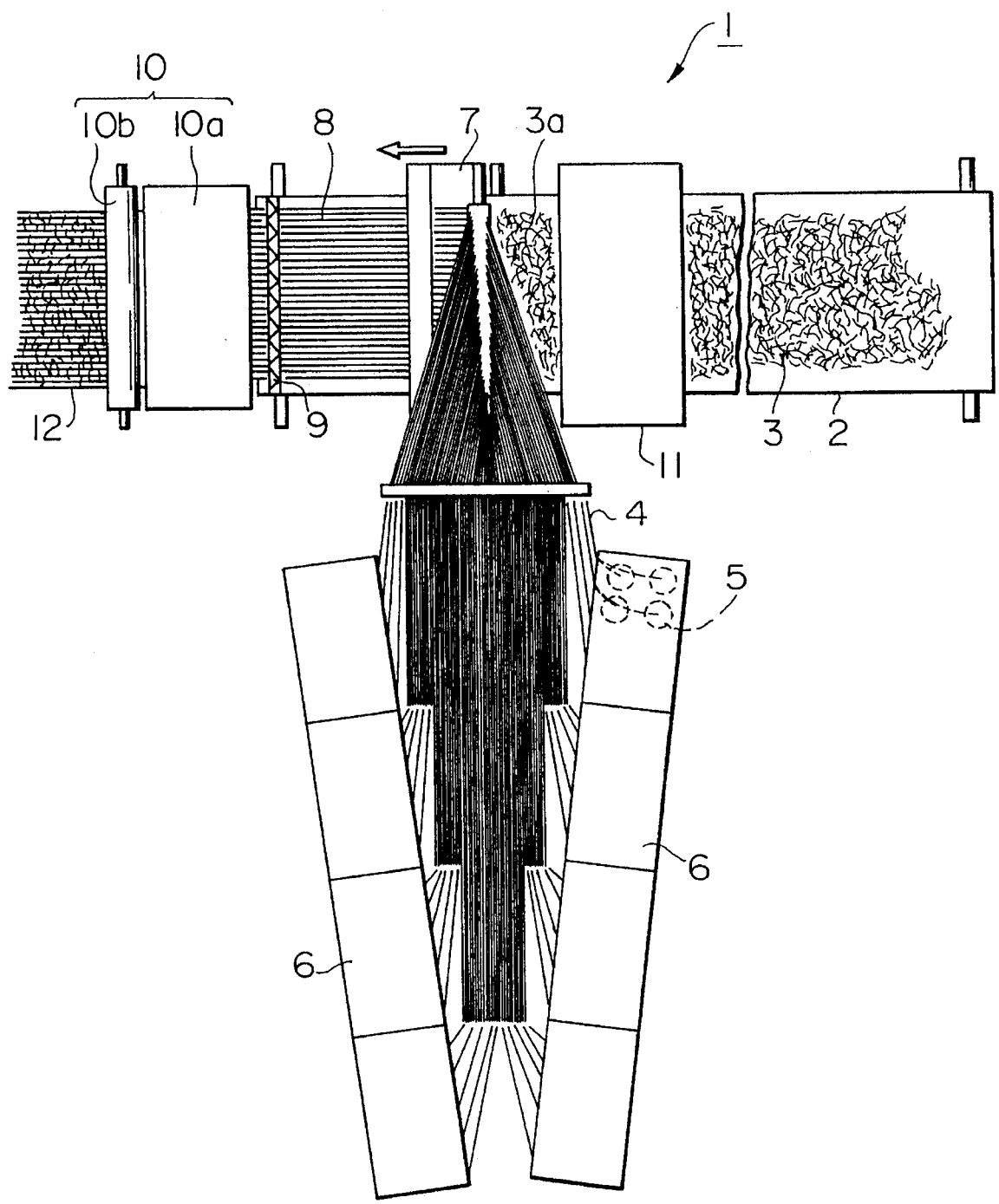
FIG. 1 is a top plan view of an example of a glass-fiber-mat manufacturing equipment in which a glass fiber mat is produced which is used as a reinforcement for an FRTP stampable sheet according to the invention.

In an FRTP stampable sheet according to the invention, there is used a glass fiber mat as a reinforcement, in which (i) a non-oriented fiber layer composed of glass long-fiber bundles so arranged as not to have a directional property and (ii) a unidirectional fiber layer composed of glass long-fiber bundles so arranged as to have a directional property in a predetermined direction are mechanically intertwined with each other.

The material and shape of the glass long-fiber bundles forming the non-oriented fiber layer and the unidirectional fiber layer in the glass fiber mat as a reinforcement are not particularly limited. Glass long-fiber bundles may be employed in which 100 through 4000 continuous long-Fibers of E-glass are bundled together, whose fiber diameter is 13 through 26 μm and which has generally been used conventionally as a reinforcement for a fiber-reinforced-resin composite material. At this time, the glass long-fiber bundles forming the non-oriented fiber layer and the glass long-fiber bundles forming the unidirectional fiber layer may be different from or identical with each other in fiber diameter and the bundled number of the glass long-fiber forming the glass long-fiber bundles.

Further, a content of the glass long-fiber bundles forming the unidirectional fiber layer in the glass fiber mat employed as a reinforcement, is limited to 20 wt %~80 wt %. The reason for this is that, if the content of the glass long-fiber bundles forming the unidirectional fiber layer in the glass fiber mat is less than 20 wt %, it becomes difficult to particularly increase the mechanical strength in the reinforcing direction. On the other hand, if the content exceeds 80 wt %, the strength in the direction perpendicular to the reinforcing direction of a heated blank is reduced when the FRTP stampable sheet is molded to produce a molded article, and accordingly, handling will become difficult. This is not preferable, because productibility will be reduced.

Furthermore, in the glass fiber mat which is used as a reinforcement in the FRTP stampable sheet according to the invention, it is essential that a significant amount of glass long-fiber bundles among the glass long-fiber bundles forming the unidirectional fiber layer or a significant amount of glass long-fibers in the glass long-fiber bundles forming the unidirectional fiber layer are substantially under the relaxation condition. The reason for this is as follows. That is, like the conventional one, if the glass long-fiber bundles forming the unidirectional fiber layer in the glass fiber mat contains a large amount of the glass long-fiber bundles or the glass long-fibers under the tensile condition, impregnation of the thermoplastic resin into the glass long-fiber bundles becomes insufficient so that the molding flowability in the reinforcing direction during the stamping molding and the compressive strength in the reinforcing direction are reduced. Accordingly, problems will occur which are similar to those of the aforementioned conventional FRTP stampable sheet.

In connection with the above, the substantial relaxation condition referred to in the invention means that, at stamping molding of the FRTP stampable sheet, the glass long-fiber bundles forming the unidirectional fiber layer or the glass long-fibers in the glass long-fiber bundles are relaxed to such an extent that the molding flowability in the reinforcing direction is not prevented, the tensile strength of the molded article which is produced by stamping molding of the FRTP stampable sheet is not excessively reduced in the reinforcing direction.

The glass long-fiber bundles substantially under the relaxation condition do specifically mean glass long-fiber bundles in which the length of the glass long-fiber bundles as viewed in plane is 1.005 through 1.10 times the length of the FRTP stampable sheet in the reinforcing direction (the orientation direction of the glass long-fiber bundles forming the unidirectional fiber layer). In the glass long-fiber bundles forming the unidirectional fiber layer, the content of the glass long-fiber bundles substantially under the relaxation condition is limited to 15%~100%, whereby it is possible to produce functional advantages of the invention. Particularly preferable content is 50%~100%.

If the length of the glass long-fiber bundles substantially under the relaxation condition is less than 1.005 times the length of the FRTP stampable sheet in the reinforcing direction, problems will arise which are similar to those of the conventional FRTP stampable sheet. On the other hand, if the above-mentioned length exceeds 1.10 times, the tensile strength in the reinforcing direction will excessively be reduced. Moreover, if the content of the glass long-fiber bundles substantially under the relaxation condition is less than 15% in the glass long-fiber bundles forming the unidirectional fiber layer, problems will arise which are similar to those of the conventional FRTP stampable sheet.

In connection with the above, the length of the glass long-fiber bundles, as viewed in plane, means the following length. That is, a sample, whose length is 200 mm in the reinforcing direction, is brought down out of the FRTP stampable sheet, for example. The sample is burned to incinerate a resin contained therein. Subsequently, the residue is again burned to remove soot therefrom, to obtain a glass fiber mat. The glass fiber mat is taken in photograph. The length of the glass long-fiber bundles on the photograph enlarged two times is measured by means of a measuring instrument such as a curvi meter or the like. Thus, the length of the glass long-fiber bundles is determined. At this time, when obtaining the glass fiber mat, some of the glass long-fiber bundles forming the unidirectional fiber layer are colored by blue ink, whereby iron containing pigment contained in the blue ink, acts as so-called glaze at burning or combustion, and as a result, some of the glass long-fiber bundles are colored red. Accordingly, it becomes easy to measure the length of the glass long-fiber bundles after the soot has been removed. Alternatively, a plurality of glass long-fiber bundles are selected among the whole glass long-fiber bundles forming the unidirectional fiber layer in the glass fiber mat from which the soot has been removed, and they are marked with an oily marking pen. This also facilitates measurement in length of the glass long-fiber bundles.

Furthermore, the glass long-fibers substantially under the relaxation condition do specifically mean glass long-fibers whose length is 1.005~1.10 times the length of the FRTP stampable sheet in the reinforcing direction (orientation direction of the glass long-fiber bundles forming the unidirectional fiber layer). The content of the glass long-fibers substantially under the relaxation condition in the glass long-fiber bundles forming the unidirectional fiber layer is brought to 35%~100%, whereby it is possible to produce functional advantages of the invention. Particularly preferable percentage is 40%~100%.

if the length of the glass long-fiber bundles substantially under the relaxation condition is less than 1.005 times the length of the FRTP stampable sheet in the reinforcing direction, problems similar to those of the conventional FRTP stampable sheet will arise. If the length exceeds 1.10 times, the tensile strength in the reinforcing direction is excessively reduced. Moreover, if the content of the glass long-fibers substantially under the relaxation condition in the glass long-fiber bundles forming the unidirectional fiber layer is less than 35%, problems similar to those of the conventional FRTP stampable sheet will also arise.

The length of the glass long-fibers referred to here means as follows. That is, a sample having its length of 100 mm in the reinforcing direction is brought down out of the FRTP stampable sheet. The sample is scrape-processed until the length in the reinforcing direction is brought to 90 mm. Subsequently, the sample is burned to incinerate the resin contained therein. The residue is further burned to remove soot therefrom. Thus, the glass fiber mat is obtained. The glass long-fiber bundles forming the unidirectional fiber layer are peeled off from the glass fiber mat. The above-described length means the length of the glass long-fibers having their length approximately equal to the length (90 mm) of the sample in the reinforcing direction, which is contained in the above-mentioned glass long-fiber bundles peeled off. That is, the length means the length of the glass long-fibers in which, in the glass long-fiber bundles forming the unidirectional fiber layer in the sample, the glass long-fibers are not cut at manufacturing of the glass fiber mat. It is possible to easily measure such length of the glass fibers by means of a traveling microscope or the like, under the condition that the glass fibers are fixed onto a board or the like.

The glass fiber mat, which is used as a reinforcement in the FRTP stampable sheet according to the invention, can be produced as follows. That is, for example, the glass long-fiber bundles is uniformly shaken down spirally onto a mesh conveyor made of steel, thereby forming a non-oriented fiber layer. A plurality of glass long-fiber bundles are arranged on the non-oriented fiber layer in parallel relation to the advancing direction of the mesh conveyor, thereby forming a unidirectional fiber layer. Subsequently, the glass long-fibers are intertwined with each other by means of needle punching, to mechanically intertwine both layers with each other.

At this time, attention is paid to the fact that the content of the glass long-fiber bundles forming the unidirectional fiber layer, in the glass fiber mat, is brought to 20 wt %~80 wt %. Further, attention is paid to the fact that a significant amount of glass long-fiber bundles among the glass long-fiber bundles forming the unidirectional fiber layer or a significant amount of glass long-fibers in the glass long-fiber bundles forming the unidirectional fiber layer is brought substantially to the relaxation condition. Bringing the significant amount of glass long-fiber bundles in the glass long-fiber bundles forming the unidirectional fiber layer or the significant amount of glass long-fibers in the glass long-fiber bundles forming the unidirectional fiber layer, substantially into the relaxation condition, is practiced as follows. That is, when forming the unidirectional fiber layer of the glass fiber mat, the tension acting upon each glass long-fiber bundle should be weakened, or supply speed of the unidirectional fiber layer to a needle punch machine should be faster than taking-over speed thereof from the needle punch machine.

In manufacturing the glass fiber mat which is used as a reinforcement in the FRTP stampable sheet according to the invention, in the case where the glass long-fibers are mechanically intertwined with each other by means of needle punching, the needle punching may be done from any one of the side of the unidirectional fiber layer and the side of the non-oriented fiber layer, if disturbance of the orientation of the glass long-fiber bundles forming the unidirectional fiber layer is within a range which does not excessively reduce the tensile strength of the produced FRTP stampable sheet in the reinforcing direction. Moreover, needle punching may be done from both sides.

The FRTP stampable sheet according to the invention can be produced as follows. That is, the above-described glass fiber mat is employed as a reinforcement. The glass fiber mat is impregnated under a molten condition, with a thermoplastic resin such as polypropylene, polyamide, polyethylene terephthalate, polybutylene terephthalate, polyphenylene sulfide, polyphenylene oxide, polyacetal, polyallylate, polyethylene, polyether ketone, thermoplastic polyurethane, polyvinyl chloride, polyvinylidene chloride, polystyrene, ABS resin or the like. A polymer blend or polymer alloy consisting of at least two thermoplastic resins mentioned above may be used. Subsequently, the thermoplastic resin is cooled and solidified. Thus, there is produced the FRTP stampable sheet according to the invention.

In the FRTP stampable sheet according to the invention, the content of the glass fiber mat is limited to 20 wt %~55 wt %. The reason for this is as follows. That is, if the content of the glass fiber mat in the FRTP stampable sheet is less than 20 wt %, reinforcing effects due to the glass fiber mat will be insufficient. Accordingly, it is impossible to produce a molded article which has superior mechanical strength. On the other hand, if the content exceeds 55 wt %, the impregnation of the thermoplastic resin into the glass long-fiber bundles forming the glass fiber mat is reduced. Accordingly, it is impossible to produce a molded article which has superior compressive strength.

The thus formed FRTP stampable sheet according to the invention contains, as a reinforcement, the glass fiber mat in which the non-oriented fiber layer and the unidirectional fiber layer are mechanically intertwined with each other, in the content of 20 wt %~55 wt %. The glass long-fiber bundles forming the unidirectional fiber layer are contained in the glass fiber mat in the content of 20 wt %~80 wt %. Accordingly, the FRTP stampable sheet has superior tensile strength in any direction, and has particularly superior tensile strength in the reinforcing direction.

Further, since the significant amount of the glass long-fiber bundles in the glass long-fiber bundles forming the unidirectional fiber layer in the glass fiber mat or the significant amount of glass long-fibers in the glass long-fiber bundles forming the unidirectional fiber layer is brought substantially into the relaxation condition, the impregnation ability of the thermoplastic resin into these glass long-fiber bundles is improved. Accordingly, the FRTP stampable sheet has also superior molding flowability in the reinforcing direction and compressive strength in the reinforcing direction.

As described above, since the FRTP stampable sheet according to the invention has superior molding flowability in the reinforcing direction, it is possible at molding to reduce the kinds of the blank sizes. Furthermore, since the charge pattern can be simplified more than the conventional one, it is possible to improve the productivity, particularly in the case of the molded article having a complicated shape or configuration. Moreover, even in the case where the stampable sheet is stamping-molded into a molded article having irregularities, occurrence of underfill and occurrence of weld can be reduced, making it possible to efficiently produce a molded article in which the glass long-fibers are distributed as a whole, that is, a molded article which has superior reliability. Further, by stress applied at molding, the glass long-fiber bundles or the glass fibers substantially under the relaxation condition, forming the unidirectional fiber layer, are brought to a more tensile condition in the irregular position of the molded article. Accordingly, there is produced a molded article which has also superior tensile strength in the reinforcing direction.

Furthermore, in the case where a molded article is manufactured from the FRTP stampable sheet according to the invention, since the FRTP stampable sheet is enhanced in impregnation of the thermoplastic resin therewith, it is possible to produce a molded article having superior compressive strength in the reinforcing direction. Moreover, it is extremely reduced that the glass fibers are exposed to the surface of the molded article, making it possible to improve a fine view of the molded article and to facilitate its handling.

The molded article according to the invention is formed from the FRTP stampable sheet according to the invention, which has the above-discussed advantages, that is, the single FRTP stampable sheet or the laminated FRTP stampable sheets is stamping-molded to obtain the molded article. Accordingly, the molded article according to the invention is a molded article which has superior tensile strength in any direction, compressive strength in the reinforcing direction, reliability and fine view, and is a molded article which is easy in handling.

The invention will further be described with reference to various examples.

EXAMPLE 1

A glass fiber mat, which was used as reinforcement, was manufactured in the following manner, by a glass-fiber-mat manufacturing equipment 1 shown in FIG. 1.

First, glass long-fiber bundles, in which four-hundred (400) continuous long-fibers of E-glass whose fiber diameter was 23 μm were bundled, were used as glass long-fiber bundles for a non-oriented fiber layer. The glass long-fiber bundles was shaken down spirally onto an endless mesh conveyor 2 uniformly in a predetermined thickness to form a non-oriented fiber layer 3. Separately, glass long-fiber bundles 4, in which one-thousand (1000) continuous long fibers of E-glass whose fiber diameter was 23 μm were bundled, were used as glass long-fiber bundles for a unidirectional fiber layer. A predetermined number of rovings 5 of the glass long-fiber bundles 4 were arranged on shelves 6, to form, by a feed roller assembly 7 having three (3) rollers, a unidirectional fiber layer 8 which was composed of the predetermined number of the glass long-fiber bundles 4. The unidirectional fiber layer 8 was supplied to a needle punch machine 10 in a direction parallel to an advancing direction of the mesh conveyor 2, through a comb-type guide 9 variable in pitch. In this connection, the needle punch machine 10 comprises a section 10a performing punching by means of a plurality of needles, and a delivery roller assembly 10b for drawing out the glass fiber mat in which the non-oriented fiber layer 3 and the unidirectional fiber layer 8 are mechanically intertwined with each other by the punching.

In the needle punch machine 10, a non-oriented fiber layer 3a after it has been dried by a dryer 11, and the unidirectional fiber layer 8 were needle-punched from the side of the unidirectional fiber layer 8 and were mechanically intertwined with each other, to produce a glass fiber mat 12 in which the content of the unidirectional fiber layer 8 was 55 wt %. At this time, supply speed (feed speed of the feed roller assembly 7, and so forth) of the unidirectional fiber layer 8 to the needle punch machine 10 was 0.99 times taking-over speed from the needle punch machine 10 (speed of the delivery roller assembly 10b, and so forth) [hereinafter, (the feed speed of the feed roller assembly 7)/(the speed of the delivery roller assembly 10b) will be referred to as "speed ratio"]. In this connection, a tension of 25 g per one bundle (a tension measured between the feed roller assembly 7 and the comb-type guide 9, and so forth) was applied to the glass long-fiber bundles 4 forming the unidirectional fiber layer 8.

Subsequently, the obtained two glass fiber mats were employed. Polypropylene sheets were arranged respectively on the sides of the non-oriented fiber layers of the respective glass fiber mats. An extruded molten article of polypropylene was interposed between both the glass fiber mats. The glass fiber mats were laminated one upon the other such that the unidirectional fiber layers of both the glass fiber mats were located on the inside. The glass fiber mats were heated to melt the polypropylene sheets. The glass fiber mats were impregnated with the polypropylene under molten condition, under pressurization. Subsequently, the glass fiber mats were cooled under pressurization. Thus, there was produced an FRTP stampable sheet in which the content of the glass fiber mats was 42 wt %.

A length of the glass long-fiber bundles forming the unidirectional fiber layer, in the thus obtained FRTP stampable sheet, as viewed in plane, was measured in the following manner.

First, in the glass-fiber-mat manufacturing equipment 1 shown in FIG. 1, ten (10) bundles of the rovings 5 of the glass long-fiber bundles 4 forming the unidirectional fiber layer 8 were colored by blue ink (Blue Black manufactured by Pilot ink Kabushiki Kaisha). A glass fiber mat was similarly manufactured except that the colored glass long-fiber bundles from these colored rovings 5 were arranged at intervals of about 10 cm. Subsequently, the obtained glass fiber mat was used to produce an FRTP stampable sheet whose width was 1000 mm by the aforesaid method.

Subsequently, a plate of 1000×200 mm, whose length in the reinforcing direction was 200 mm, was brought down out of the obtained sheet. The plate was divided into five (5) pieces whose width was 200 mm, and each of the five pieces was burned within a combustion furnace for about twenty (20) minutes to incinerate the resin contained therein. Subsequently, the residue after burning was put into an electric furnace of 650° C. for about twenty (20) minutes to incinerate and remove soot, and was taken in photograph. The photograph was enlarged two times and, subsequently, was printed. A length of the glass long-fiber bundles colored by the blue ink was measured by a curbi meter (trade name: Digital Curbi Meter S type, manufactured by Kabushiki Kaisha Uchida Youkou) (hereinafter, this measuring method will be referred to as "method A"). At this time, since pigment in the blue ink, including iron, acted as so-called glaze within the electric furnace, and as a result, it was colored red, measurement was possible even on the glass fiber mat after incineration.

From these measurement results, an amount of the glass long-fiber bundles substantially under the relaxation condition, referred to in the invention, that is, an amount of the glass long-fiber bundles, in which the length measured by the method A was 1.005 through 1.10 times the length (200 mm) of the plate, was determined.

As a result, the amount of the glass long-fiber bundles substantially under the relaxation condition referred to in the invention was 60% (6 bundles/10 bundles) as depicted in the table 1.

Separately, the length of the glass long-fibers in the glass long-fiber bundles forming the unidirectional fiber layer, in the FRTP stampable sheet produced in the above-described manner, was measured by the following method.

First, ten (10) samples of 100×100 mm, whose length in the reinforcing direction was 100 mm, were obtained by dividing the FRTP stampable sheet, which has first been produced and whose width was 1000 mm by using a cutter. Each of the samples was scrape-processed until the length in the reinforcing direction became 90 mm. Subsequently, the sample was burned in a combustion furnace for twenty (20) minutes, to remove the resin contained therein. The residue was further burned in an electric furnace at 650° C. for twenty (20) minutes, to remove soot therefrom. Thus, glass fiber consisting of the unidirectional fiber layer and the non-oriented fiber layer taken out under a condition of being laminated one upon the other.

Subsequently the two fiber layers in, the glass fiber mat under the condition of being laminated one upon the other were separated from each other. Each glass long-fiber bundles forming the unidirectional fiber layer was peeled off from the unidirectional glass fiber mat. Glass long-fibers, which were considered to have their length approximately identical with the length (90 mm) in the reinforcing direction of the cutting processed samples, were pulled out of each of the glass fiber bundles. The pulled-out glass long-fibers (60 in sum) were fixed straight on black plates, respectively. The length of the pulled-out glass long-fibers was measured by a traveling microscope (hereinafter, this measuring method will be referred to as "method B").

Among 60 glass fibers, glass long-fibers, whose length was less than the length (90 mm) of the samples in the reinforcing direction, were excluded. An amount of glass long-fibers substantially under the relaxation condition referred to in the invention, which were contained in the total glass long-fibers longer than the length (90 mm) in the reinforcing direction of the cutting processed samples, that is, an amount of glass long-fibers whose length measured by the method B was 1.005~1.10 times the length (90 mm) of the cutting-processed samples was measured.

As a result, the amount of glass long-fibers substantially under the relaxation condition referred to in the invention was 45.0% (18/40) as depicted in the table 1.

Furthermore, in measuring the tensile strength and the compressive strength of the produced FRTP stampable sheet, two blanks, whose dimension was 240×240 mm, were brought down out of the FRTP stampable sheet. The two blanks were heated such that surface temperature of the blanks was brought to 200°±10° C. Subsequently, the blanks were laminated one upon the other such that their reinforcing directions were coincident with each other. The blanks were molded under such conditions that mold temperature was 40° C., press pressure was 135 tons, press pressurization speed was 12 mm/sec, and cooling time was 30 sec. Thus, there was produced a planar plate whose dimension was 300×300 min. Subsequently, a strength-measuring test piece (hereinafter referred to as "MD test piece") whose longitudinal direction was coincident with the reinforcing direction, and a strength-measuring test piece (hereinafter referred to as "TD test piece") whose longitudinal direction was perpendicular to the reinforcing direction, were brought down out of the molded planar plate. The tensile strength and the compressive strength were measured in the following manner.

(a) Tensile Strength

An MD test piece and a TD test piece, whose configuration was in accordance with ASTM D-638, were brought down, and tensile strength was measured for each of the MD test piece and the TD test piece, in accordance with ASTM D-638.

(b) Compressive Strength

Figure 2:
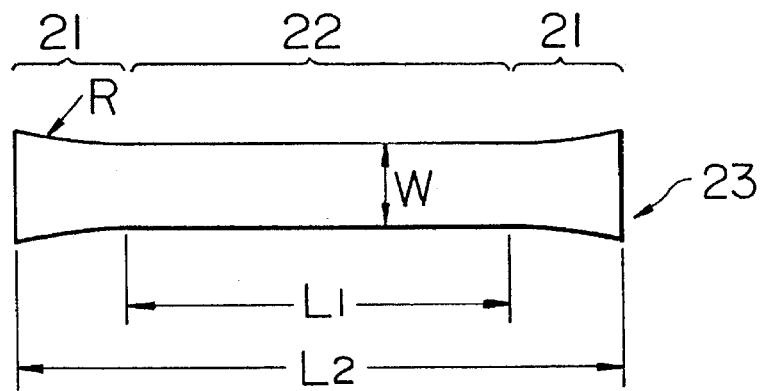
FIG. 2 is a top plan view showing a test piece for measuring compressive strength of the FRTP stampable sheet.

A strength-measuring test piece 23, whose both ends 21 on the short sides had a radius of curvature (R) of 76 mm as shown in FIG. 2, which spread like an unfolded fan, and whose central section 22 was rectangular having a width (W) of 12.5 mm and a length ($L_1$) of 57 mm, and whose entire length ($L_2$) was 90 mm, was brought down out of the molded planar plate, for each of the MD test piece and the TD test piece.

Figure 3A:
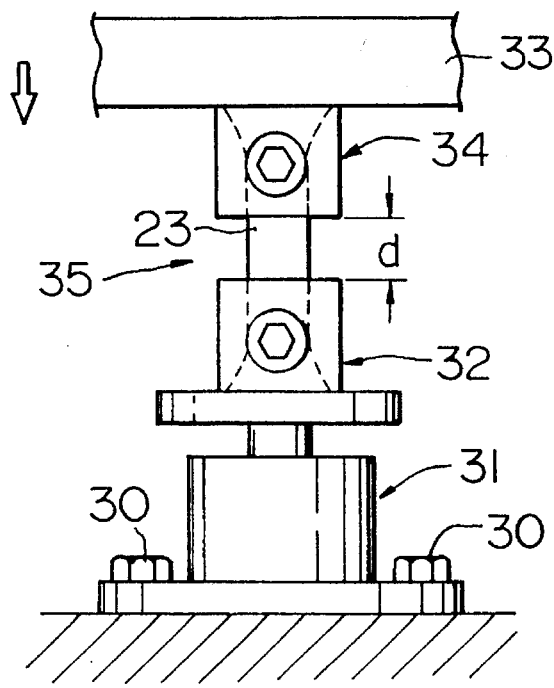
FIG. 3a is a front elevational view showing a compressive-strength test apparatus.
Figure 3B:
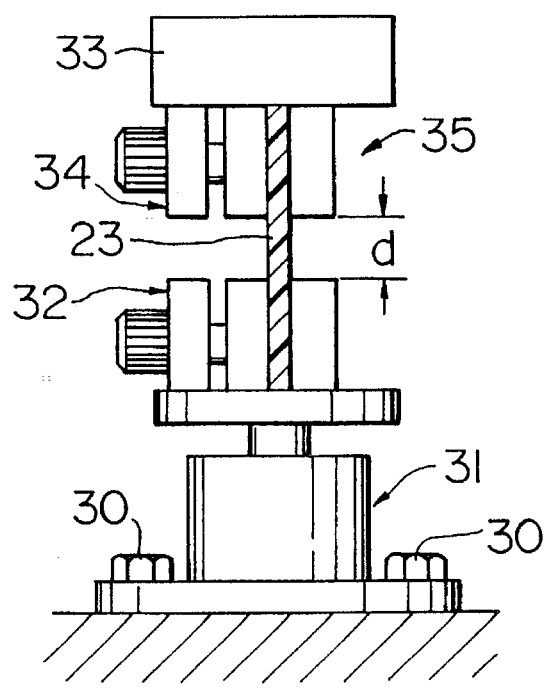
FIG. 3b is a side elevational view showing the compressive-strength test apparatus.

Subsequently, as shown in FIGS. 3a and 3b, a compressive-strength test apparatus 35 was used which comprised a test-piece holder 32 fixedly mounted on a load cell 31 fixed by means of bolts 30, and a test-piece holder 34 fixedly mounted on a cross head 33 located above the load cell 31, at a location adjacent to the load cell 31. Tile strength-measuring test piece 23 shown in FIG. 2 was held, under a longitudinal condition, at a location between the test-piece holders 32 and 34 of the compressive-strength test apparatus 35 such that a distance d between the test-piece holders 32 and 34 was brought to 20 mm. The cross head 33 was moved toward the load cell 31 at speed of 2 mm/min. The compressive strength of the strength test piece 23 was measured for each of the MD test piece and the TD test piece.

These measuring results were shown in the table 1.

EXAMPLES 2 THROUGH 4 AND COMPARATIVE EXAMPLE 1

Similar to the Example 1 except that the following glass fiber mat was used as the aforesaid glass fiber mat, there were produced four (4) kinds of FRTP stampable sheets.

① A glass fiber mat in which the content of the unidirectional fiber layer was 55 wt %, and which was produced similarly to the Example 1, except that the supply speed of the unidirectional fiber layer was changed to 1.01 times (tension was 0 g/bundle) the taking-over speed from the needle punch machine, so that an amount of the glass long-fiber bundles substantially under the relaxation condition and an amount of the glass long-fibers substantially under the relaxation condition in the glass long-fiber bundles forming the unidirectional fiber layer were different from those of the Example 1 (Example 2).

② A glass fiber mat in which the content of the unidirectional fiber layer was 55 wt %, and which was produced similarly to the Example 1, except that the supply speed of the unidirectional fiber layer was changed to 1.03 times (tension was 0 g/bundle) the taking-over speed from the needle punch machine, so that an amount of the glass long-fiber bundles substantially under the relaxation condition and an amount of the glass long-fibers substantially under the relaxation condition in the glass long-fiber bundles forming the unidirectional fiber layer were different from those of the Examples 1 and 2 (Example 3).

③ A glass fiber mat in which the content of the unidirectional fiber layer was 55 wt %, and which was produced similarly to the Example 1, except that the supply speed of the unidirectional fiber layer was changed to 1.05 times (tension was 0 g/bundle) the taking-over speed from the needle punch machine, so that an amount of the glass long-fiber bundles substantially under the relaxation condition and an amount of the glass long-fibers substantially under the relaxation condition in the glass long-fiber bundles forming the unidirectional fiber layer were different from those of the Examples 1, 2 and 3 (Example 4).

④ A glass fiber mat in which the content of the unidirectional fiber layer was 55 wt %, and which was produced similarly to the Example 1, except that the supply speed of the unidirectional fiber layer was changed to 0.95 times (tension was 125 g/bundle) the taking-over speed from the needle punch machine, so that an amount of the glass long-fiber bundles substantially under the relaxation condition and an amount of the glass long-fibers substantially under the relaxation condition in the glass long-fiber bundles forming the unidirectional fiber layer were out of the range defined in the invention (Comparative Example 1).

The length of the glass long-fiber bundles forming the unidirectional fiber layers in each sheet and the length of the glass long-fibers in the glass long-fiber bundles forming the unidirectional fiber layer were measured by the methods A and B similarly to the Example 1. An amount of the glass long-fiber bundles substantially under the relaxation condition, in the glass long-fiber bundles forming the unidirectional fiber layer, and an amount of the glass long-fibers substantially under the relaxation condition, in the glass long-fiber bundles forming the unidirectional fiber layer were measured, similarly to the Example 1. Further, the tensile strength and the compressive strength of each sheet were measured similarly to the Example 1.

These results were shown in the table 1.

TABLE 1

| | | SPEED RATIO*[1] | RELAXATION PERCENTAGE (%)*[2] | | (a)TENSILE STRENGTH [kg/m$^2$] | | (b)COMPRESSIVE STRENGTH [kg/m$^2$] | |
|---|---|---|---|---|---|---|---|---|
| | | | METHOD A | METHOD B | MD TEST PIECE | TD TEST PIECE | MD TEST PIECE | TD TEST PIECE |
| EXAMPLE | 1 | 0.99 | 60 | 45.0 | 22.0 | 4.8 | 16.0 | 6.3 |
| | 2 | 1.01 | 70 | 50.0 | 21.5 | 5.2 | 15.7 | 6.5 |
| | 3 | 1.03 | 80 | 83.6 | 20.0 | 5.5 | 15.0 | 6.8 |
| | 4 | 1.05 | 100 | 93.1 | 18.5 | 5.0 | 11.5 | 7.0 |
| COMPARATIVE EXAMPLE | 1 | 0.95 | 10 | 30.0 | 22.0 | 5.0 | 10.0 | 6.1 |

*[1]: $\text{SPEED RATIO} = \dfrac{\text{FEED SPEED OF FEED ROLLER ASSEMBLY}}{\text{SPEED OF DELIVERY ROLLER ASSEMBLY}}$

*[2] Relaxation Percentage indicates:
(1) in method A, an amount of glass long-fiber bundles substantially under the relaxation condition, in the total glass long-fiber bundles forming the unidirectional fiber layer, and
(2) in method B, an amount of glass long-fibers substantially under the relaxation condition, in the total glass long-fiber bundles forming the unidirectional fiber layer.

As will be clear from the table 1, in each of the glass fiber mats used, as a reinforcement, in the FRTP stampable sheets produced respectively according to the Examples 1 through 4, the glass long-fiber bundles substantially under the relaxation condition referred to in the invention exist in 60~100 wt % in the total glass long-fiber bundles forming the unidirectional fiber layer. Further, in each of the glass fiber mats used, as a reinforcement, in the FRTP stampable sheets produced respectively according to the Examples 1 through 4, the glass long-fibers substantially under the relaxation condition referred to in the invention exist in 45.0~93.1 wt % in the glass long-fiber bundles forming the unidirectional fiber layer.

The compressive strength of the planar-plate molded article produced according to the Examples 1 through 4, whose material is the FRTP stampable sheet, is higher than the compressive strength of the planar-plate molded article according to the Comparative Example 1, produced from the FRTP stampable sheet whose reinforcement is the glass fiber mat in which the amount (percentage) of the glass long-fiber bundles substantially under the relaxation condition referred to in the invention is not within a range of 15~100%, and in which the amount (percentage) of the glass long-fibers substantially under the relaxation condition referred to in the invention is not within a range of 35~100%. Furthermore, the tensile strength of the planar-plate molded article produced according to the Examples 1 through 3 is substantially identical with the tensile strength of the planar-plate molded article produced according to the Comparative Example 1.

in connection with the above, the tensile strength of the planar-plate molded article produced according to the Example 4 is lower than the tensile strength of the planar-plate molded article produced according to the Comparative Example 1. As will be clear from Examples 7 and 10 to be described subsequently, however, in the case where stamping molding is done on a molded article having irregularities, the glass long-fiber bundles substantially under the relaxation condition forming the unidirectional fiber layer is brought to a more tensile condition in the irregular portion of the molded article by the stress at molding. Accordingly, the FRTP stampable sheet gives a molded article which has higher tensile strength in the reinforcing direction than the planar-plate molded article.

Moreover, observation of the cross-sectional face of each of the FRTP stampable sheets produced according to the Examples 1 through 4 and the Comparative Example 1 indicated as follows. That is, in the sheet according to the Comparative Example 1, impregnation of the molten extruded polypropylene interposed between the glass fiber mats, into the glass long-fiber bundles was insufficient, and the polypropylene existed in a thickness of the order of 1.6 mm. In contrast, in the sheets according to the Examples 1 through 4, however, impregnation of the resin into the glass long-fiber bundles was sufficient, and the thickness of the polypropylene was less than 1 mm.

EXAMPLES 5 THROUGH 10 AND COMPARATIVE EXAMPLES 2 through 3

The FRTP stampable sheets produced according to the Examples 1, 3 and 4 were employed to form a test beam supposing the bumper beam, in the following manner.

① Three (3) blanks (hereinafter referred to as "A-type blank") whose length in the reinforcing direction was 1450 mm and whose length in a direction perpendicular to the reinforcing direction was 100 mm, and eight (8) blanks (hereinafter referred to as "B-type blank") whose length in the reinforcing direction was 785 mm and whose length in a direction perpendicular to the reinforcing direction was 100 mm were brought down out of the FRTP stampable sheet produced according to the Example 1. Subsequently, these blanks were heated such that their surface temperature was brought to 200°±10° C. Subsequently, three (3) heated A-type blanks were laminated upon each other so as to arrange their reinforcing directions. Eight (8) heated B-type blanks were laminated upon the three heated A-type blanks such that the reinforcing directions of the respective B-type blanks were arranged. The A-type and B-type blanks were molded under conditions that mold temperature was 40° C., press pressure was 300 tons, press pressurization speed was 12 mm/sec, and cooling time was 50 sec, to form a test beam whose weight was 5.0 kg. Likewise, there were produced ten (10) test beams in sum (Example 5).

② Similarly to the Example 5 except that the FRTP stampable sheet produced according to the Example 3 was used, there were produced ten (10) test beams, in sum, identical in configuration and identical in weight with the Example 5 (Example 6).

③ Similarly to the Example 5 except that the FRTP stampable sheet produced according to the Example 4 was used, there were produced ten (10) test beams, in sum, identical in configuration and identical in weight with the Example 5 (Example 7).

④ Similarly to the Example 5 except that the FRTP stampable sheet produced according to the Comparative Example 1 was used, there were produced ten (10) test beams, in sum, identical in configuration and identical in weight with the Example 5 (Comparative Example 2).

⑤ Configuration of the blanks brought down out of the FRTP stampable sheet produced according to the Example 1 was changed to one in which the length in the reinforcing direction was 1450 mm and the length in the direction perpendicular to the reinforcing direction was 91.7 mm. The blanks were molded under conditions identical with those of the Example 5 except that eight (8) blanks were employed. There were produced ten (10) test beams, in sum, identical in configuration and identical in weight with the Example 5 (Example 8).

⑥ Similarly to the Example 8 except that the FRTP stampable sheet produced according to the Example 3 was used, there were produced ten (10) test beams, in sum, identical in configuration and identical in weight with the Example 8 (Example 9).

⑦ Similarly to the Example 8 except that the FRTP stampable sheet produced according to the Example 4 was used, there were produced ten (10) test beams, in sum, identical in configuration and identical in weight with the Example 8 (Example 10).

⑧ Similarly to the Example 8 except that the FRTP stampable sheet produced according to the Comparative Example 1 was used, there were produced ten (10) test beams, in sum, identical in configuration and identical in weight with the Example 8 (Comparative Example 3).

Figure 4A:
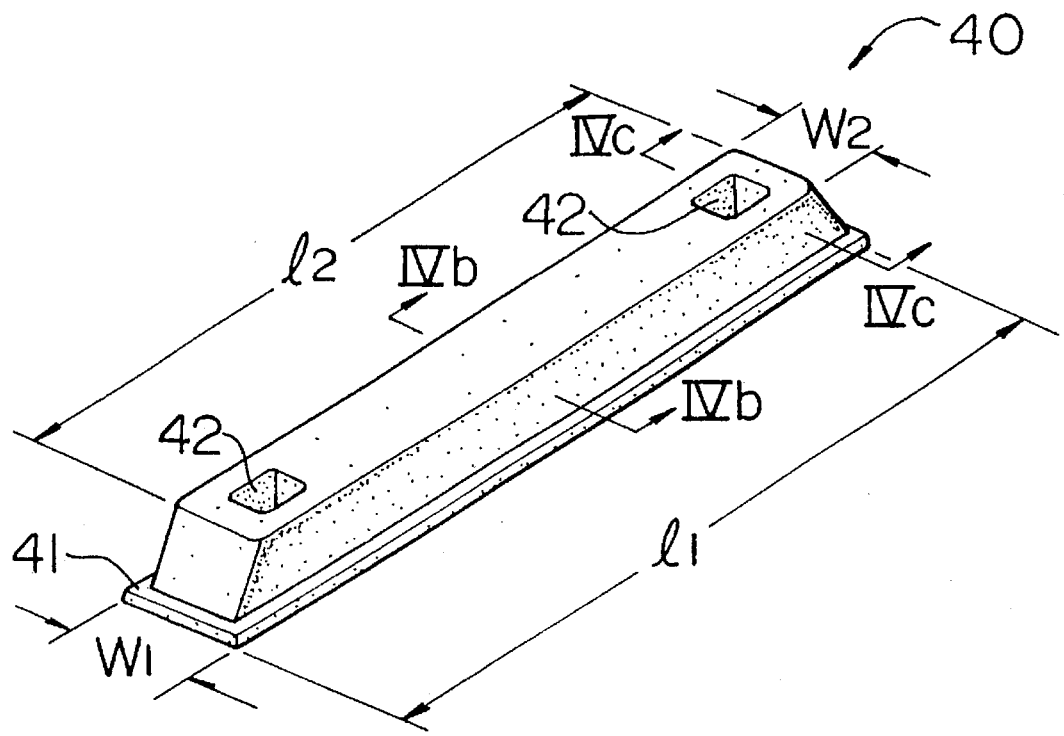
FIG. 4a is a perspective view showing a test beam.
Figure 4B:
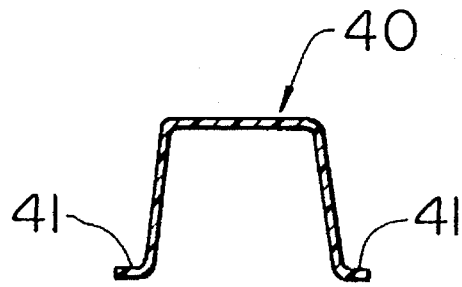
Figure 4C:
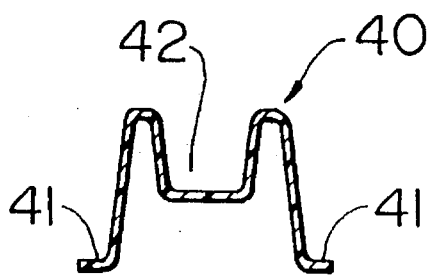

In connection with the above, as shown in FIGS. 4a, 4b and 4c, any of test beams 40 are a molded article of U-shaped cross-section having a flange 41 at each end on the side of an opening face. An entire length ($l_1$) on the side of the opening face was 1500 mm, a width ($w_1$) was 160 mm, an entire length ($l_2$) on the side of a closed face was 1200 mm. and a width ($w_2$) was 100 mm. A pair of stay mounting recesses 42 are provided at both ends on the side of the closed face. A distance between the centers of the recesses is 1200 mm.

Visual observation confirmed the presence or absence of underfill with reference to the thus produced test beams. Further, presence or absence of welds in both side faces of the test beams in the longitudinal direction, particularly, in central portions adjacent to side section of the stay-mounting recesses (that is, four (4) locations per one test beam) was confirmed by the use of soft X-rays. The results are depicted in the table 2.

Moreover, a breaking load of each of the test beams was measured in the following manner.

Figure 5A:
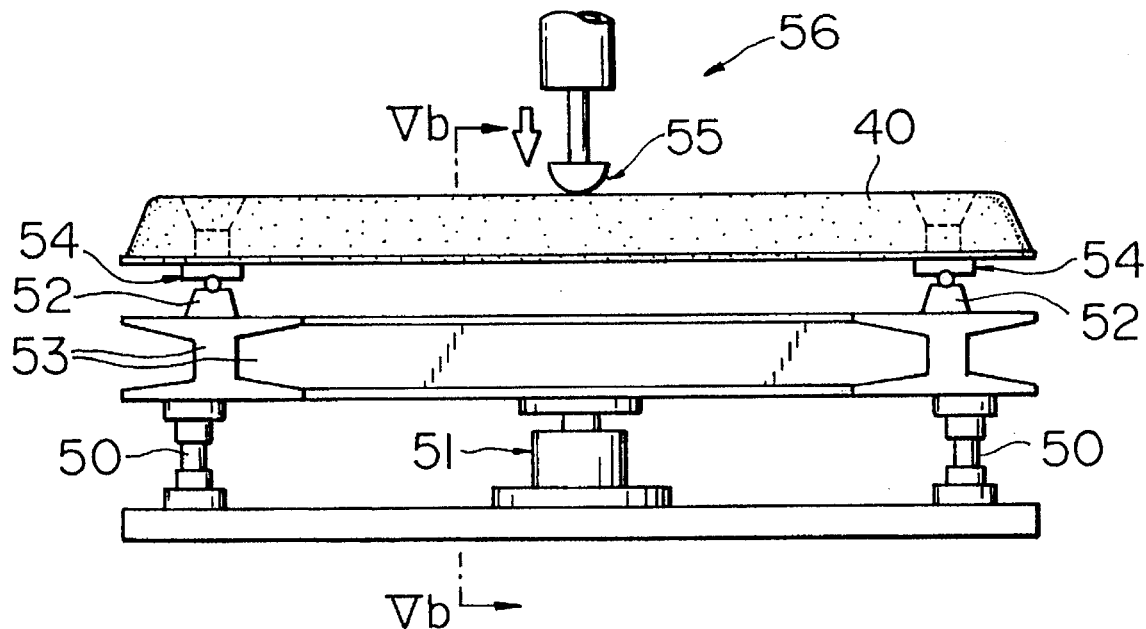
FIG. 5a is a front elevational view showing a three-point bending test apparatus.
Figure 5B:
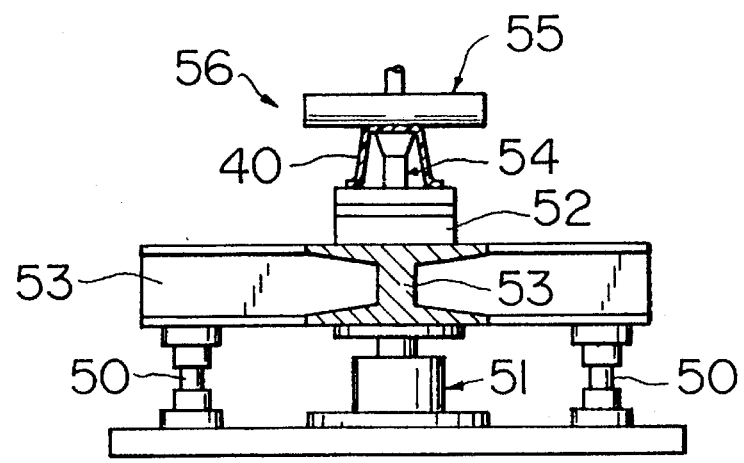

As shown in FIGS. 5a and 5b, a three-point bending test apparatus 56 was used which comprised a frame 53 supported by four (4) guide posts 50 and a single load cell 51 and having support-jig engaging sections 52 at both ends on an upper face in the lengthwise direction; a pair of support jigs 54 provided respectively on the support-jig engaging sections 52 of the frame 53 for angular movement; and a presser (radius at its forward end: 90 mm) 55 located above a space between the support jigs 54. The support jigs 54 were abutted respectively against the bottoms of the stay-mounting sections 42 of the test beam 40, to support the same. Three-point bending test was conducted under such conditions that descending speed of the presser 55 was 2 mm/sec, and atmosphere temperature was 23°±3° C. A load (breaking load) at the time the test beam was destroyed or broken was measured. Simultaneously, determination of the breaking mode was made.

These results were depicted in the table 2, with the breaking load being broadly divided into a mean value (X)

of ten (10) samples, and a standard deviation (σ) thereof and a lower control-limit value (X–3σ) and with the breaking mode being broadly divided into compressive breaking (central compression) at the central portion and shearing breaking (stay shearing) adjacent to the stay mounting portions.

Furthermore, the mean values in the breaking load of the test beams according to the Examples 5 through 10 were considerably larger than the mean values in the breaking load of the test beams according to the Comparative Example 2 and 3. Thus, the test beams according to the Examples 5 through 10 were superior in mechanical

TABLE 2

| | | BLANK SIZE*1 | MOLDABILITY (PRESENCE OF UNDERFILL) | PRESENCE OF WELD*2 | BREAKING LOAD [kg] | | | BREAKING MODE |
|---|---|---|---|---|---|---|---|---|
| | | | | | MEAN VALUE (X) | STANDARD DEVIATION (σ) | (X–3σ)*3 | |
| EXAMPLE | 5 | 100 × 1450 × 3<br>100 × 785 × 8 | ALL NONE | 40% | 5600 | 454 (8.1%) | 4238 | CENTRAL COMPRESSION 6<br>STAY SHEARING 4 |
| | 6 | 100 × 1450 × 3<br>100 × 785 × 8 | ALL NONE | 22.5% | 5500 | 413 (7.5%) | 4261 | CENTRAL COMPRESSION 8<br>STAY SHEARING 2 |
| | 7 | 100 × 1450 × 3<br>100 × 785 × 8 | ALL NONE | 7.5% | 5050 | 303 (6.0%) | 4141 | CENTRAL COMPRESSION 10 |
| COMPARATIVE EXAMPLE | 2 | 100 × 1450 × 3<br>100 × 785 × 8 | ALL NONE | 65% | 4500 | 380 (8.4%) | 3360 | CENTRAL COMPRESSION 5<br>STAY SHEARING 5 |
| EXAMPLE | 8 | 91.7 × 1450 × 8 | ALL NONE | 0% | 5550 | 228 (4.1%) | 4866 | CENTRAL COMPRESSION 10 |
| | 9 | 91.7 × 1450 × 8 | ALL NONE | 0% | 5400 | 205 (3.8%) | 4785 | CENTRAL COMPRESSION 10 |
| | 10 | 91.7 × 1450 × 8 | ALL NONE | 0% | 5000 | 210 (4.2%) | 4370 | CENTRAL COMPRESSION 10 |
| COMPARATIVE EXAMPLE | 3 | 91.7 × 1450 × 8 | ALL EXISTANCE | 0% | 4450 | 185 (4.2%) | 3895 | CENTRAL COMPRESSION 10 |

*1NUMERICAL VALUES INDICATE (LENGTH IN THE REINFORCING DIRECTION) × (LENGTH IN A DIRECTION PERPENDICULAR TO THE REINFORCING DIRECTION) × (NUMBER), AND UNIT OF THE LENGTH IS [mm].
*2NUMBER OF LOCATIONS WHERE WELD OCCURS, AMONG FORTY (40) LOCATIONS [(FOUR (4) LOCATIONS/SINGLE ONE) × (TEN (10))] IS REPRESENTED BY %.
*3A LOWER CONTROL-LIMIT VALUE (A LOWER LIMIT VALUE WITHIN A QUALITY WARRANTY RANGE) IS REPRESENTED.

As will be clear from the table 2, underfill could not be seen in the test beams of the Examples 5 through 7 in which there were used two kinds of blank sizes. Further, underfill could not also be seen in the Examples 8 through 10 in which there was used a single kind of blank size. This was because the molding flowability of the FRTP stampable sheets used in the Examples 8 through 10 in the reinforcing direction was superior. To the contrary, although underfill could not be seen in the test beam according to the Comparative Example 2 in which there were used two kinds of blank sizes, underfill could be seen in all of the test beams according to the Comparative Example 3 in which there was used a single kind of blank size. This was because the molding flowability of the used FRTP stampable sheet was low in the reinforcing direction.

Further, since the FRTP stampable sheets used in the Examples 5 through 7 had higher molding flowability in the reinforcing direction than those employed in the Comparative Example 2, the number of the test beams according to the Examples 5 through 7, in which weld occurred, were smaller than the number of those according to the Comparative Example 2.

strength. Moreover, the lower control-limit values of the test beams according to the Examples 5 through 10 were considerably larger than the lower control-limit values of the test beams according to the Comparative Examples 2 and 3. It was confirmed that the test beams of the Examples 5 through 10, particularly the Examples 8 through 10 were low in quality variation, and were high in reliability.

In connection with the above, even in the test beams according to the Examples 7 and 10, which are produced by the use of the FRTP stampable sheet according to the Example 4 lower in tensile strength in the reinforcing direction at the time of being formed into the planar-plate molded article, than the FRTP stampable sheet according to the Comparative Example 1, there can be obtained more superior results than the test beams according to the Comparative Examples 2 and 3 which are produced by the use of the FRTP stampable sheet according to the Comparative Example 1. This is because the test beams according to the Examples 7 and 10 have more superior compressive strength in the reinforcing direction than the test beams according to the Comparative Examples 2 and 3, and because stamping molding of the FRTP stampable sheet according to the Example 4 into the molded article having irregularities causes the stress at molding to bring the glass long-fiber bundles and the glass long-fibers substantially under the relaxation condition, forming the unidirectional fiber layer, further to the tensile condition in the irregular portions of the molded article, so that the tensile strength in the reinforcing direction is more improved than the planar-plate molded article.

Concerning the breaking mode of the test beams, in the Examples 5 and 6 of the Examples 5 through 7 in which the weld occurred, both the stay shearing and the central compression were observed. In the Example 7, in which the weld occurred was slight, the stay shearing was not observed, but only the central compression was observed. On the other hand, in the Comparative Example 2, there were many stay shearings because of the weld, so that some test beams were broken by the central compression at a low load. Further, in the Examples 8 through 10 and the Comparative Example 3 in which no weld occurred, the breaking mode was all the central compression.

In connection with the above, almost no exposed glass fibers could be seen on the surface of each of the test beams produced according to the Examples 5 through 10. Thus, the test beams produced according to the Examples 5 through 10 have more superior fine view and easier handling property than the test beams according to the Comparative Examples 2 and 3, in which many glass fibers were exposed.

As illustrated above in the Examples, the FRTP stampable sheet according to the invention has improved impregnation of the thermoplastic resin into the glass long-fiber bundles forming the unidirectional fiber layer and has superior molding flowability in the reinforcing direction and the compressive strength. Further, the molded article according to the invention, which is obtained from the above-described FRTP stampable sheet, has superior tensile strength in any direction and has also superior compressive strength in the reinforcing direction. Furthermore, the molded article has also superior Fine view and handling.

Accordingly, carrying the invention into practice enables The FRTP stampable sheet superior in mechanical strength, reliability, Fine view and easiness of handling, and the molded article thereof, to be easily produced under high productivity.

What is claimed is:

1. A stampable sheet made of fiber-reinforced thermoplastic resin, comprising: a glass fiber mat impregnated with thermoplastic resin, said glass fiber mat being formed by mechanically intertwining (i) a non-oriented fiber layer comprised of glass continuous long-fiber bundles so arranged as to have random directional orientations and (ii) a unidirectional fiber layer comprised of glass continuous long-fiber bundles arranged unidirectionally, a content of said glass fiber mat in the stampable sheet made of the fiber-reinforced thermoplastic resin being 20 wt %–55 wt %, a content of the glass continuous long-fiber bundles forming said unidirectional fiber layer in said glass fiber mat being 20 wt %–80 wt %, and a quantity of glass continuous long-fiber bundles among the glass continuous long-fiber bundles forming said unidirectional fiber layer being under a relaxation condition, the length of the glass continuous long-fiber bundles substantially under the relaxation condition being 1.005 to 1.10 times the length of the stampable sheet in the direction of fiber orientation of the glass continuous long-fiber bundles forming the unidirectional fiber layer, and a content of said glass continuous long-fiber bundles substantially under the relaxation condition, among the glass continuous long-fiber bundles forming the unidirectional fiber layer, being 15% through 100%.

2. A molded article wherein one or more stampable sheets made of the fiber-reinforced thermoplastic resin according to claim 1 are press-molded.

3. A stampable sheet according to claim 1 wherein the quantity of glass continuous long-fiber bundles under the relaxation condition is sufficient such that at during stamp molding of the stampable sheet the molding flowability in the reinforcing direction is not prevented and the tensile strength of the molded sheet is not substantially reduced in the direction of the unidirectional fiber layer.

4. A molded article according to claim 1 wherein said thermoplastic resin is polypropylene.

5. A molded article according to claim 1 wherein the content of the glass long-fibers substantially under the relaxation condition in the glass long-fiber bundles forming the unidirectional fiber layer is 35%–100%.

6. A stampable sheet made of fiber-reinforced thermoplastic resin, comprising: a glass fiber mat impregnated with thermoplastic resin, said glass fiber mat being formed by mechanically intertwining (i) a non-oriented fiber layer comprised of glass continuous long-fiber bundles so arranged as to have random directional orientations and (ii) a unidirectional fiber layer comprised of glass continuous long-fiber bundles arranged unidirectionally, a content of said glass fiber mat in the stampable sheet made of the fiber-reinforced thermoplastic resin being 20 wt %–55 wt %, a content of the glass continuous long-fiber bundles forming said unidirectional fiber layer in said glass fiber mat being 20 wt %–80 wt %, and a quantity of glass continuous long-fibers among the glass continuous long-fibers forming said unidirectional fiber layer being under a relaxation condition, the length of the glass continuous long-fibers substantially under the relaxation condition being 1.005 to 1.10 times the length of the stampable sheet in the direction of fiber orientation of the glass continuous long-fibers forming the unidirectional fiber layer, and a content of said glass continuous long-fibers substantially under the relaxation condition, of the glass continuous long-fibers forming the unidirectional fiber layer, being 35%–100%.

7. A molded article comprised of one or more stampable sheets made of the fiber-reinforced thermoplastic resin according to claim 3 are press-molded.

8. A stampable sheet according to claim 6 wherein the quantity of glass continuous long-fiber bundles under the relaxation condition is sufficient such that during stamp molding of the stampable sheet the molding flowability in the reinforcing direction is not prevented and the tensile strength of the molded sheet is not substantially reduced in the direction of the unidirectional fiber layer.

9. A molded article according to claim 6 wherein said thermoplastic resin is polypropylene.

* * * * *

UNITED STATES PATENT AND TRADEMARK OFFICE
CERTIFICATE OF CORRECTION

PATENT NO. : 5,540,986
DATED : July 30, 1996
INVENTOR(S) : Hiroshi Kimura; Makoto Maeda; Toshihara Hirai It is certified that error appears in the above-identified patent and that said letters patent is hereby corrected as shown below:

Column 12,
In Table 1, the units under the column headings "(a) TENSILE STRENGTH" and "(b) COMPRESSIVE STRENGTH" should read --$kg/mm^2$--.

Signed and Sealed this

Seventh Day of January, 1997

BRUCE LEHMAN

Attest:

Attesting Officer

Commissioner of Patents and Trademarks